(12) United States Patent
Almomani

(10) Patent No.: US 9,691,207 B2
(45) Date of Patent: *Jun. 27, 2017

(54) ELECTRONIC LOCK WITH USER INTERFACE

(71) Applicant: Spectrum Brands, Inc., Middleton, WI (US)

(72) Inventor: Nedal Akram Almomani, Mission Viejo, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,535

(22) Filed: Jun. 3, 2016

(65) Prior Publication Data

US 2016/0284148 A1    Sep. 29, 2016

Related U.S. Application Data

(63) Continuation-in-part of application No. 14/063,120, filed on Oct. 25, 2013, now Pat. No. 9,390,572.

(60) Provisional application No. 61/719,039, filed on Oct. 26, 2012.

(51) Int. Cl.
  G07C 9/00    (2006.01)
  H04L 29/08   (2006.01)
  H04W 4/00    (2009.01)

(52) U.S. Cl.
  CPC ..... *G07C 9/00817* (2013.01); *G07C 9/00309* (2013.01); *H04L 67/34* (2013.01); *H04W 4/001* (2013.01); *G07C 2009/00841* (2013.01)

(58) Field of Classification Search
  CPC ............ G07C 9/00817; G07C 9/00309; G07C 9/00857; G07C 9/00007; G07C 9/00571; G07C 2009/00841
  USPC ........... 340/5.22, 5.24, 5.7, 5.25, 5.61, 5.65, 340/5.51, 5.54, 5.32; 235/382; 455/420
  See application file for complete search history.

(56) References Cited

U.S. PATENT DOCUMENTS

| | | | |
|---|---|---|---|
| 2002/0180582 A1 | 12/2002 | Nielsen | |
| 2003/0151493 A1* | 8/2003 | Straumann | G07C 9/00015 340/5.25 |
| 2010/0283579 A1* | 11/2010 | Kraus | G07C 9/00944 340/5.7 |
| 2012/0157080 A1* | 6/2012 | Metivier | G07C 9/00309 455/420 |
| 2012/0213362 A1* | 8/2012 | Bliding | G07C 9/00309 380/44 |
| 2013/0342314 A1* | 12/2013 | Chen | G07C 9/00309 340/5.65 |
| 2014/0028438 A1* | 1/2014 | Kuenzi | G07C 9/00817 340/5.24 |

* cited by examiner

*Primary Examiner* — Mirza Alam
(74) *Attorney, Agent, or Firm* — Michael Carton

(57) ABSTRACT

An electronic lock having one or more lock settings that can be updated using a mobile device. The mobile device includes an app that provides a user interface through which one or more lock settings of the electronic lock can be selected and modified. When the user has made the desired selections to the lock settings on the mobile device, the mobile device wirelessly transmits these settings to the electronic lock. The electronic lock is configured to update its lock settings based on the wireless communication from the mobile device.

20 Claims, 9 Drawing Sheets

ELECTRONIC LOCK WITH USER INTERFACE

RELATED APPLICATIONS

The present application is a continuation in part of U.S. patent application Ser. No. 14/063,120, filed on Oct. 25, 2013 which claims priority to Provisional Patent Application Ser. No. 61/719,039, filed on Oct. 26, 2012, entitled "Electronic Lock Having a Mobile Device User Interface." The subject matter disclosed in these applications is hereby expressly incorporated into the present application in its entirety.

TECHNICAL FIELD

The present invention relates to electronic locks, and, more particularly, to an electronic lock having a mobile device user interface.

BACKGROUND AND SUMMARY

An electronic lock typically includes a keypad having multiple buttons to facilitate lock operation. In addition, the keypad may be used to enter or change lock settings. Lock settings may include, for example, user access codes. Such entering or changing of lock settings may include programming user access codes into lock memory, deleting user access codes from lock memory, and/or entering other customer or lock settings. Typically, the keypad and other user accessible switches are used as the main user interface to change or adjust the lock settings by an authorized user.

The keypad interface is usually sufficient if the number of access codes and settings are not that many, i.e., so long as the lock user does not have to remember too many button sequences to gain access to internal menu, programming options or setting changes. This keypad user interface method, however, becomes problematic and cumbersome when the number of available user access codes exceeds the user's ability to remember the key sequences, such as for example, if the number of user access codes is high, such as 30 or more, and/or the overall number of lock settings is high.

As such, the keypad interface may not be a user friendly solution if a customer is required to push a button or a sequence of buttons multiple times to be able to program a user access code into lock memory. This also assumes the user has the instructions saved and readily available to make changes when needed.

These steps become very tedious and prone to mistakes, and eventually may result in a frustrated user of the electronic lock. Thus, the keypad user interface may yield a poor user experience when the number of features that require setting or access increase. In addition, limiting the electronic lock to a keypad user interface makes it very difficult for the manufacturer and hardware providers to enable richer options and better user experience, thus resulting in limited features in the electronic lock.

Some electronic locks have attempted to address this problem by providing a dedicated touch display rather than a keypad, but such an alternative dedicated hardware solution may face similar challenges or at the least become cost prohibitive from a manufacturing and price competition perspective.

Other solutions have attempted to provide voice feedback to the user as well. However, overall cost is major factor in providing a reasonable interactive solution.

What is needed in the art is an electronic lock having a mobile device user interface, wherein the lock settings of the electronic lock may be set wirelessly via an existing mobile device. It is recognized that mobile devices have become readily available and commonly used by the public.

With the present invention, an existing mobile device, such as a smartphone or tablet, is used to access the lock settings of the electronic lock and to make the necessary changes to the lock settings. Advantageously, with the present invention there is no need to add expensive dedicated hardware displays to the electronic lock.

Rather, with embodiments of the present invention a user operates an existing mobile device executing a lock settings user interface application, commonly referred to as an "App," configured to communicate with the electronic lock to allow the user to enter or change lock settings for the electronic lock. The mobile device user interface is easier to use than a keypad interface in modifying the lock settings of the electronic lock, and provides more programming options, thus improving the user experience in changing lock settings of the electronic lock.

Additional features and advantages of the invention will become apparent to those skilled in the art upon consideration of the following detailed description of the illustrated embodiment exemplifying the best mode of carrying out the invention as presently perceived.

BRIEF DESCRIPTION OF THE DRAWINGS

The present disclosure will be described hereafter with reference to the attached drawings which are given as non-limiting examples only, in which.

Corresponding reference characters indicate corresponding parts throughout the several views. The exemplifications set out herein illustrate an embodiment of the invention, and such exemplifications are not to be construed as limiting the scope of the invention in any manner.

DETAILED DESCRIPTION OF THE DRAWINGS

Figure 1A:
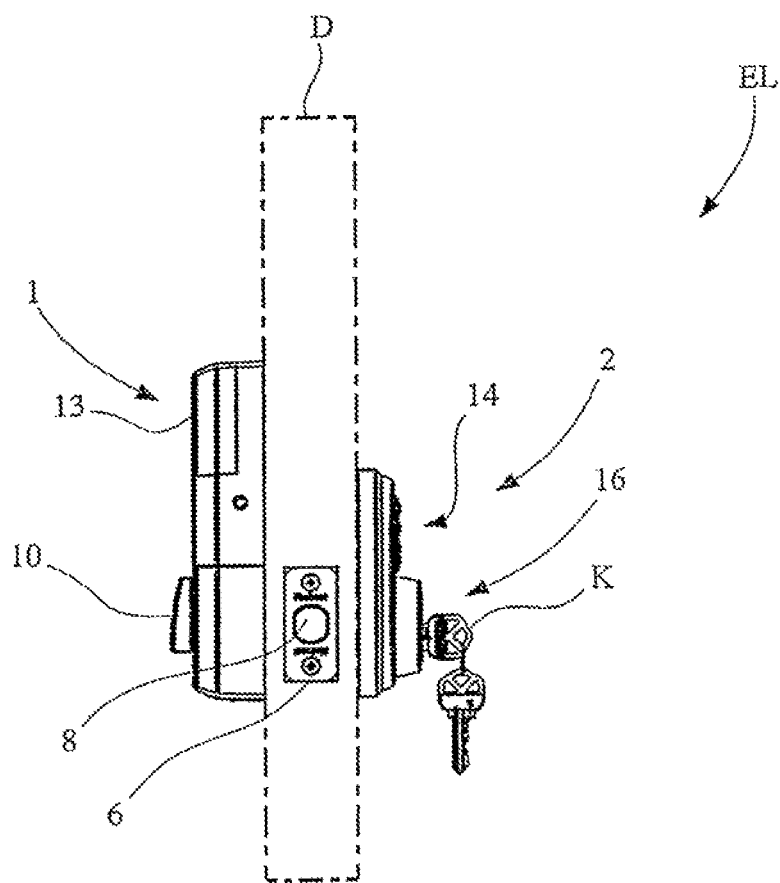
FIG. 1A is a side view of an electronic lock in accordance with an embodiment of the present invention, installed on a door and with the door show in phantom lines.
Figure 1B:
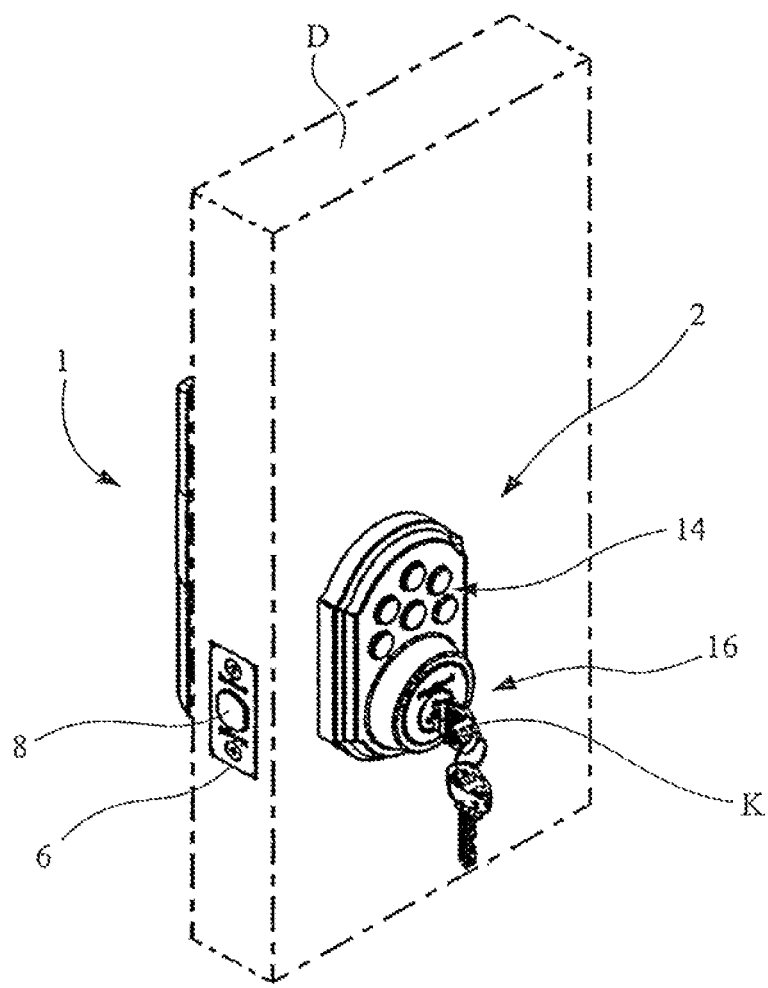
FIG. 1B is a perspective view of the electronic lock of FIG. 1A, as viewed from the exterior of the door.
Figure 1C:
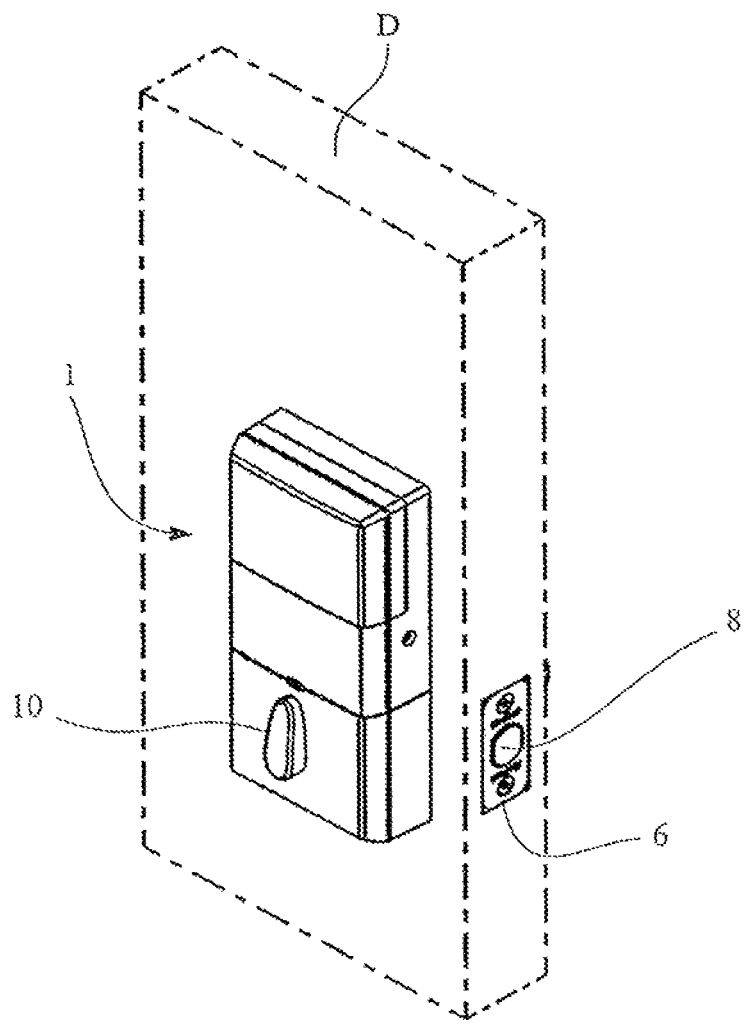
FIG. 1C is a perspective view of the electronic lock of FIG. 1A as viewed from the interior of the door.

Referring now to the drawings and particularly to FIGS. 1A-1C and 2, there is shown an electronic lock (EL) in accordance with the present invention for mounting on a door D, and which includes an interior chassis 1, an exterior chassis 2, a mounting plate 3, an adapter 4, a latch assembly 5, and a strike 6.

Figure 2:
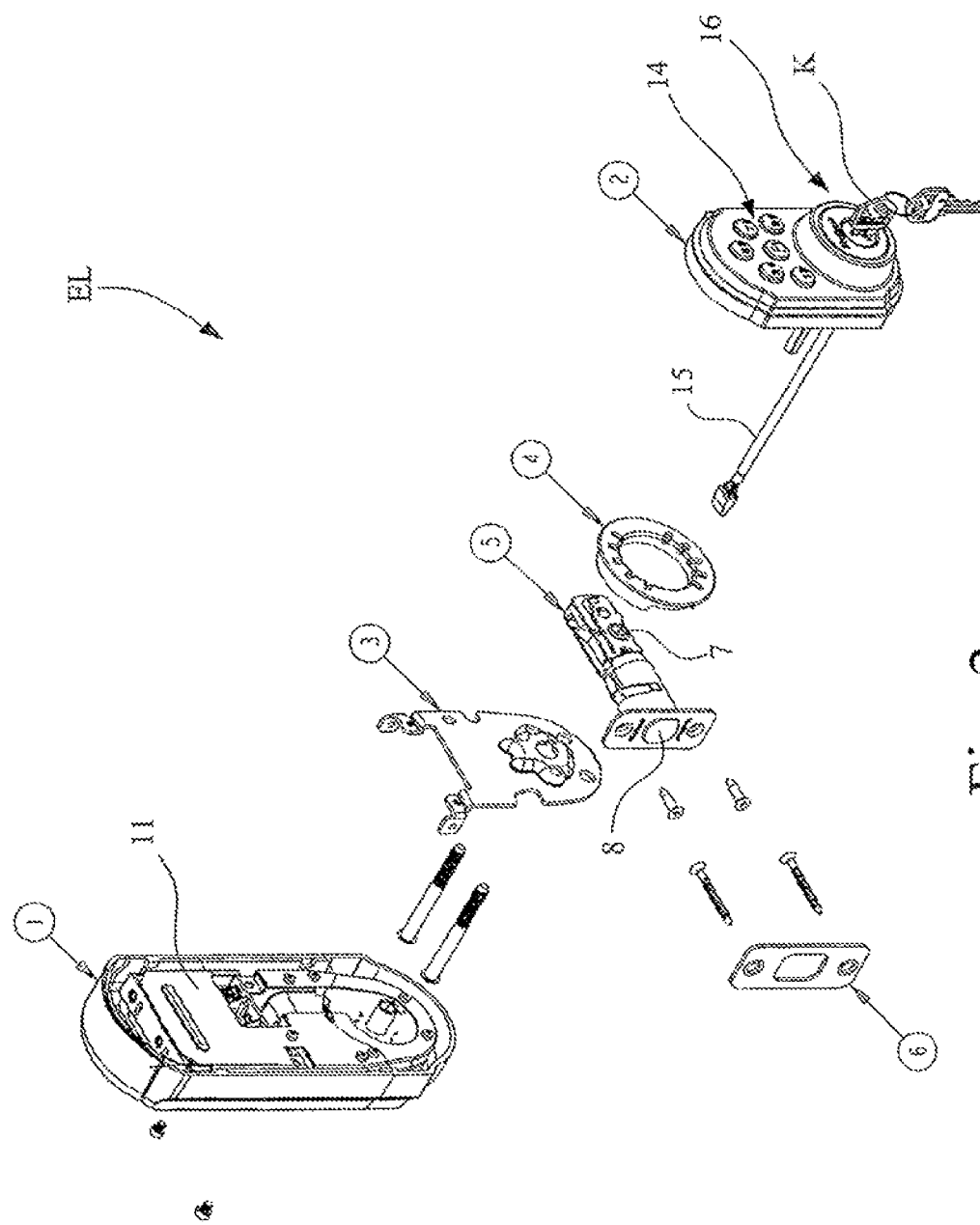
FIG. 2 is an exploded view of the electronic lock of FIGS. 1A-1C.

As shown in FIG. 2, latch assembly 5 is of a configuration well known in the art, and includes a bolt actuator mechanism 7, and a bolt 8. Mounting plate 3 is used to mount the electronic lock to the door D. Adapter 4 is used to adapt the electronic lock to a particular hole opening in the door D.

Figure 3:
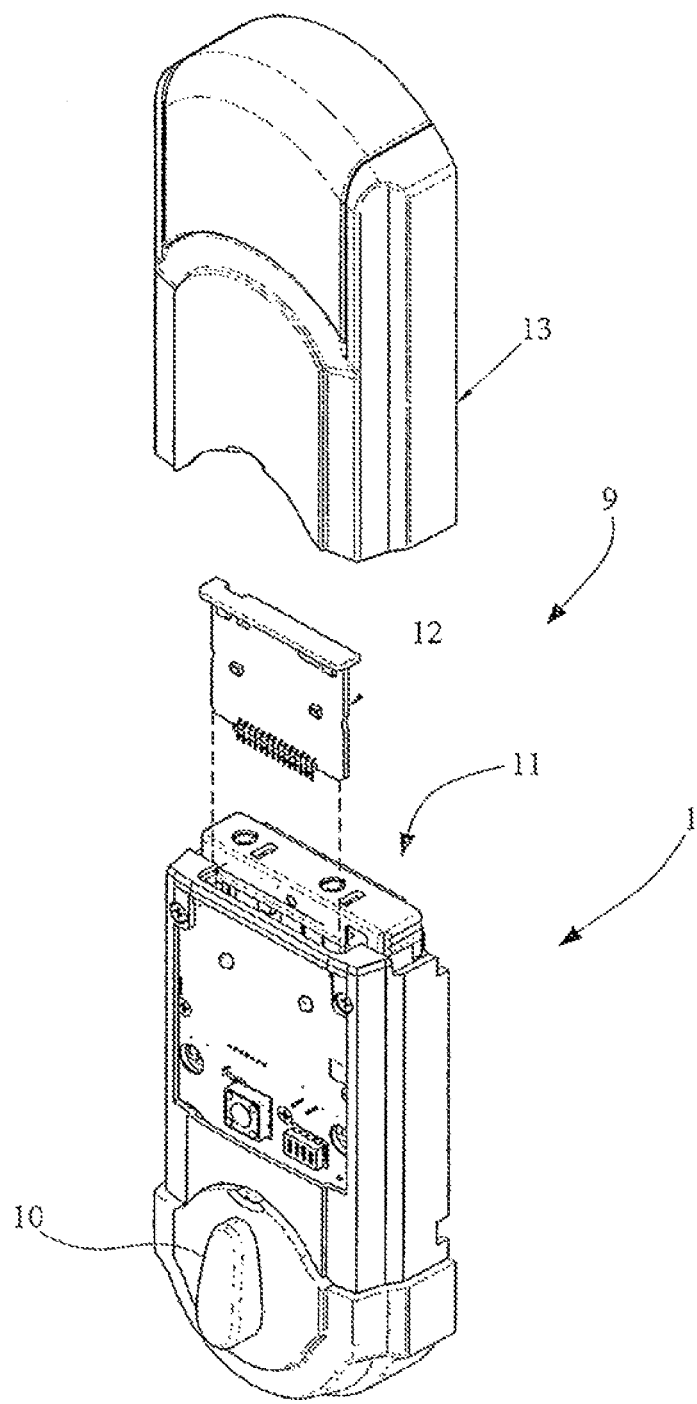
FIG. 3 is a perspective view of the interior chassis of the electronic lock of FIG. 2, with the upper cover and daughter card removed.

Referring also to FIG. 3, interior chassis 1 includes the electronic circuitry 9 for the electronic lock, and further includes a manual turnpiece 10. Manual turnpiece 10 is used on the interior side of door D to operate the bolt actuator mechanism 7 of latch assembly 5, and in turn to extend and retract bolt 8 (see also FIG. 1C). The electronic circuitry 9 includes a base board 11 and a removable daughter card 12. In FIG. 3, a removable cover 13 is provided to cover over the base board 11 and daughter card 12, when cover 13 is in the installed position.

Referring again to FIG. 2, exterior chassis 2 includes a keypad 14 for receiving a user input. Keypad 14 is electrically connected to the base board 11 of electronic circuitry 9, such as for example by an electrical cable 15. When the user inputs a valid code via keypad 14 that is recognized by the electronic circuitry 9, an electrical motor (not show) is energized to retract the bolt 8 of latch assembly 5, thus permitting door D (see FIG. 1B) to be opened from a closed position. Alternatively, a key actuator 16, having a removable key K, is provided for manually operating latch assembly 5 from the exterior of the door D.

Figure 4:
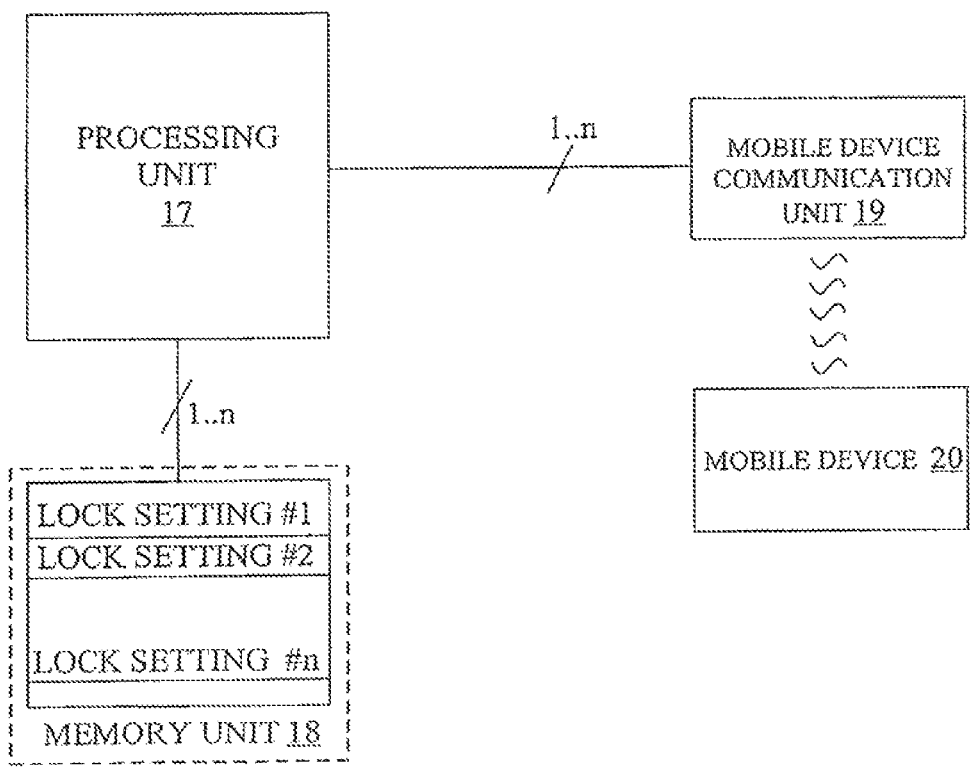
FIG. 4 is a block diagram of a portion of the electronic circuitry of the interior chassis of FIG. 3 in wireless communication with a mobile device, in accordance with an embodiment of the present invention.

Referring particularly to FIG. 3 and FIG. 4, daughter card 12 is a replaceable wireless communications module that facilitates wireless communications with an external device through a desired wireless communications protocol, e.g., Zigbee, Z-wave, etc. As such, electronic circuitry 9 may include, for example, an EMBER Corporation EM357 chip along with associated devices to handle all IEEE 802.15.4 operations. The chip and associated devices are driven by a 24.00 MHz crystal which are used to produce other internal clocks. Additional devices, such as LED's, switches, other integrated circuits, antenna and others are designed into electronic circuitry 9.

Referring to FIG. 4, electronic circuitry 9 includes a processing unit 17, a memory unit 18, and a mobile device communication unit 19 for communicating wirelessly with an existing mobile device 20. For example, accordance with the present invention, base board 11 and/or daughter card 12 of electronic circuitry 9 is configured to support wireless communication with the existing mobile device 20. The existing mobile device 20 may be, for example, a smartphone or tablet that includes an App for generating a user interface configured to communicate lock settings to/from the electronic lock EL. As used herein, a "smartphone" is a mobile phone built on a mobile operating system that has additional functionality such as that of a portable media players, digital cameras, web browsers, etc., and includes a high-resolution touch screen which provides its user interface. A "tablet", also sometimes called a tablet computer, is a mobile computer integrated into a touch screen which provides its user interface. Currently, examples of a suitable smartphone include the Apple iPhone®, the Samsung Galaxy®, etc. Examples of a suitable tablet include the Apple iPad®, Samsung Galaxy TAB®, etc.

Such wireless communication between electronics circuitry 9 and the existing mobile device 20 may utilize one or more of Bluetooth, NFC, Wifi (e.g., IEEE 802.11x), etc. communication protocols. These wireless communications of mobile device could be internal circuitry or external, such as a wireless dongle, for communicating with the electronic circuitry 9.

Processing unit 17 includes a commercially available microprocessor or a custom built processing unit (ASIC=Application Specific Integrated Circuit) and associated input/output (I/o) circuitry, and is configured for electronic communication with memory unit 18 and mobile device communication unit 19.

Memory unit 18 is an electronic semiconductor memory device, such as for example, an erasable programmable read only memory (EPROM), electrically erasable programmable read only memory (EEPROM), embedded memory in the processing unit 17, etc. As shown in FIG. 4, memory unit 18 is configured to store a plurality of lock settings #1-#n associated with the electronic lock EL. Such lock settings include, for example, user access codes (addition, deletion, modification), names for access codes, timers settings for setting schedules to make access codes valid for only a window of time, customizable sounds settings including music/audio recordings transmitted to the electronic lock from the mobile device, a tamper alarm activation, led light settings for status and battery level, selecting left hand or right hand door operation, adjusting sound volume, automatic locking schedule settings, etc.

Mobile device communication unit 19 of electronic circuitry 9 of the electronic lock EL is an ASIC configured for wireless communication with the existing mobile device 20 using one or more of Bluetooth, NFC, Wifi (e.g., IEEE 802.11x), etc. communication protocols. The communication protocols may also be used to connect the electronic lock to the internet for communication with a remote server. Over the Air (OTA) firmware updates may be pushed to the electronic lock from the remote server. Additionally, added features may be selected or purchased through the mobile device 20 and the APP that can be pushed to the electronic lock from the remote server.

Technical support may be provided to the user allowing remote access to the electronic lock through the internet in real time. The user may be guided through the technical support with the mobile device 20 by a remote technician as well. Usage data may be sent to the remote server allowing the remote technician to troubleshoot the electronic lock by viewing the usage history and logs of activity. The user may also view the usage logs with the mobile device through the APP. Lastly, lock settings may be sent to the remote server and synced with a plurality of electronic locks or synced by direct communication between each electronic lock without the use of additional gateways or hubs.

Figure 5:
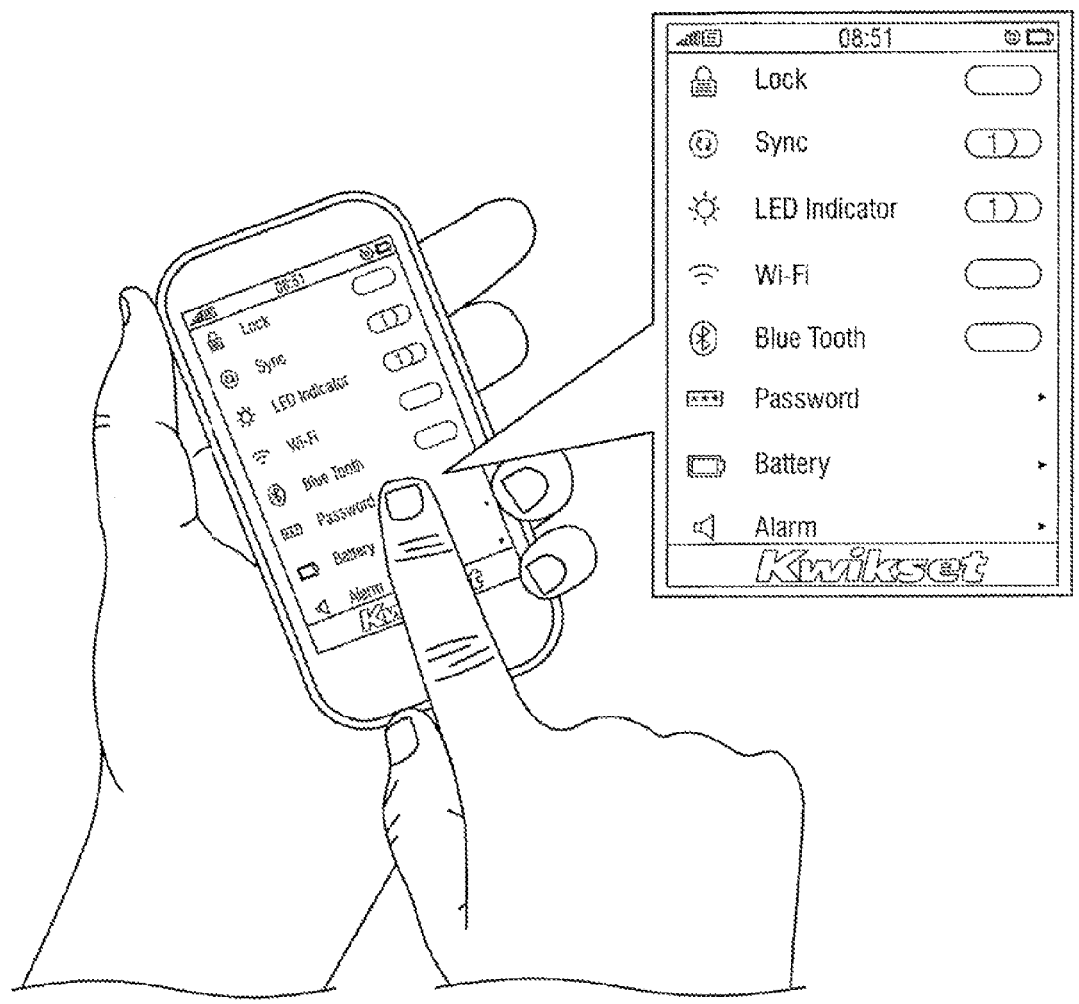
FIG. 5 is a pictorial illustration of a mobile device, such as a smartphone, executing a lock setting App that generates a lock settings mobile device user interface.
Figure 6:
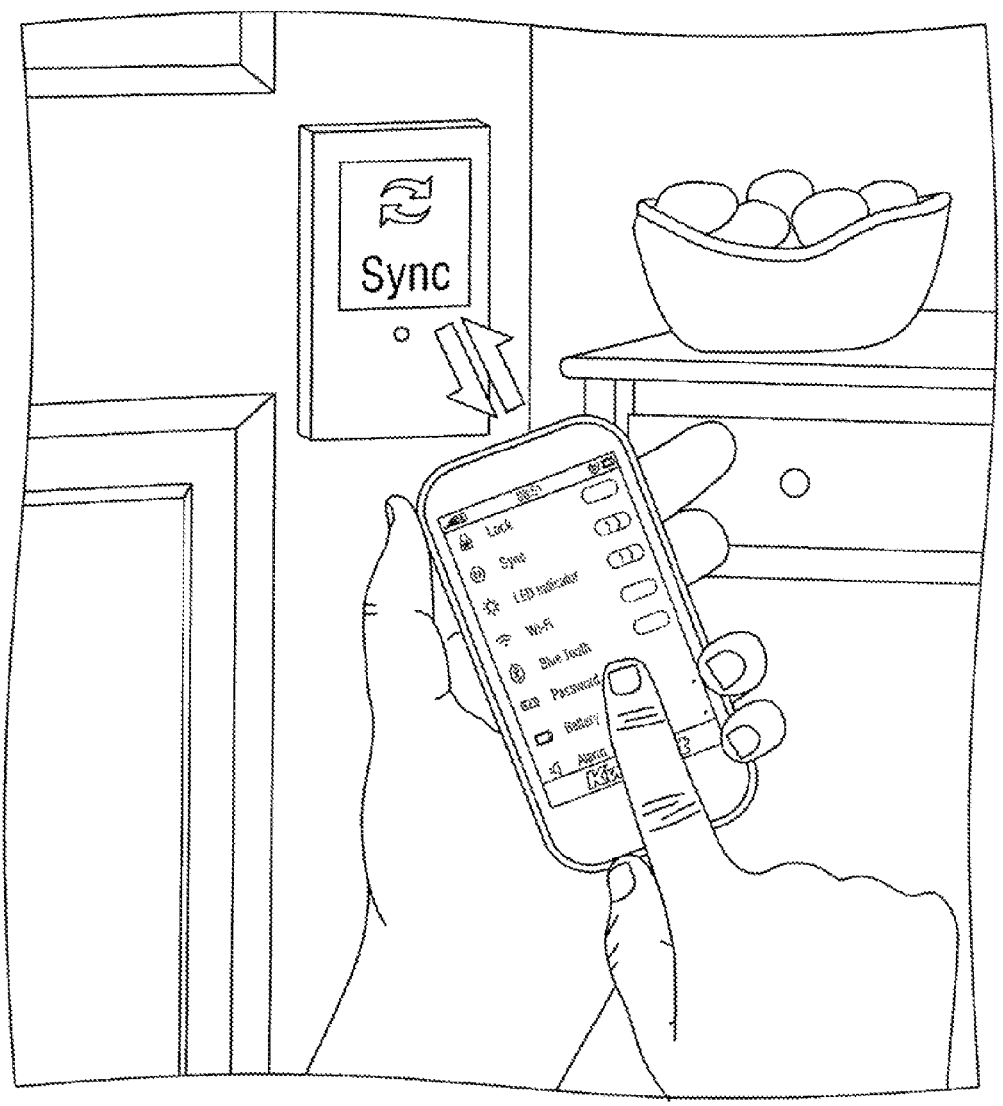
FIG. 6 is a pictorial illustration of the mobile device of FIG. 5 syncing wireless communications with an electronic lock.
Figure 7:
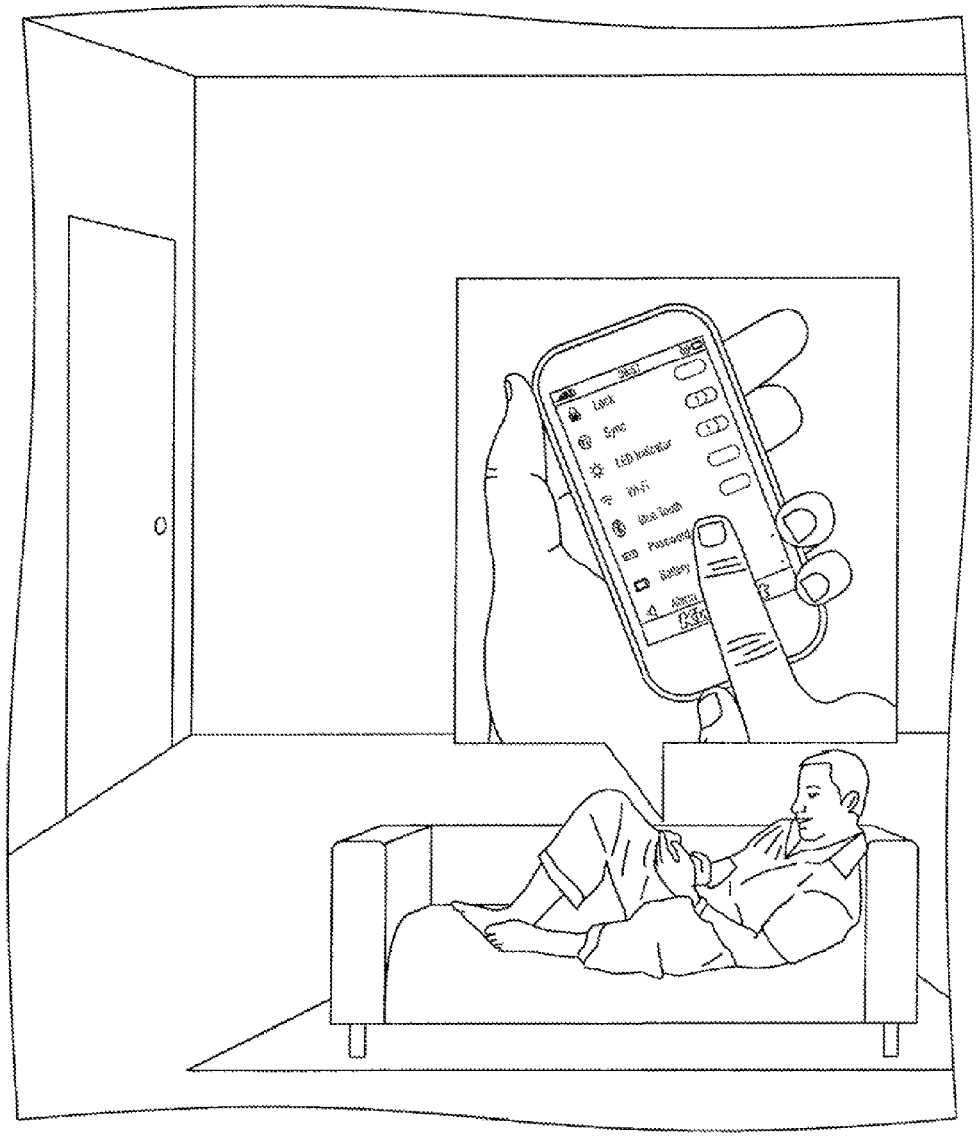
FIG. 7 is a pictorial illustration of the mobile device of FIG. 5 operating in an offline mode in which the user is modifying the lock settings of the electronic lock while not synced with the electronic lock.

Referring also to FIGS. 5-7, with the present invention, a mobile App is provided, e.g., by the electronic lock manufacturer, that enables access to all the lock settings and menus associated with the electronic lock through a lock settings mobile device user interface. This may be made available on multiple mobile operating systems (iOS, Andriod, Symbian, Windows, etc.).

In operation:
referring particularly to FIG. 6, the user walks up to the electronic lock EL to bring the mobile device 20 into wireless communication range of the electronic door lock;
referring particularly to FIGS. 5 and 6, the lock settings mobile device user interface App is opened on mobile device 20 to display the lock settings mobile device user interface on the touch screen of mobile device 20;

the user engages the mobile device user interface, e.g., presses the "Sync" icon, to load the lock settings from the electronic lock into the memory of the mobile device;

referring to FIG. 7, when the lock settings are loaded onto mobile device 20, the user can simply walk away from the electronic lock and go sit somewhere to make all changes to the lock settings, such as adding user access codes;

deleting user access codes; modifying user access codes; naming user access codes;

adding, deleting or modifying timers; adding, deleting or modifying sounds settings, etc.;

referring again to FIGS. 5 and 6, when a customer is finished making changes to the lock settings from the lock settings mobile device user interface App executing on mobile device 20, the user can walk back to the electronic lock (i.e., within wireless range) to upload or sync the changes to the electronic lock, e.g., by again pressing the "Sync" icon, to sync mobile device 20 with the electronic lock;

on the lock settings mobile device user interface generated by the mobile App, the user will press the sync "lock" settings for accepting all the changes to transfer the lock settings wirelessly from mobile device 20 to the electronic lock;

the handshaking between mobile device 20 and the electronic lock EL provides some level of feedback (e.g., a progress bar on the mobile App lock settings mobile device user interface) to show that all lock settings took effect and/or that the transfer of the lock settings to/from the electronic lock has completed successfully.

Since the electronic lock is a battery operated device, it is desirable that the mobile App generating the lock settings mobile device user interface menu should not be in a continuous synchronization mode, even though it can, to save battery life. Once the mobile device 20 is synced by either downloading the lock settings or uploading the lock settings, the user can make all the changes offline until a sync between mobile device 20 and electronic lock EL is needed. This way battery life is saved and more convenience is given to the user instead of standing next to the door for synchronization.

Encryption techniques well known in the art may be used to protect the transfer of lock setting information between the electronic lock and mobile device 20, if desired.

It is contemplated that the mobile App executing on mobile device 20 may be expanded to have other control features for the lock, if desired.

The present invention may also be used in electronic lock design and manufacturing to facilitate and simplify lock development, manufacturing testing, field repairs and other capabilities and features.

Advantageously, with the present invention there is no need to add an expensive, dedicated hardware user interface display to the electronic lock. Rather, with the present invention a user operates an existing mobile device that executes a lock settings mobile device user interface App configured to communicate with the electronic lock to allow the user to enter or change lock settings for the electronic lock. This is accomplished by establishing direct communication between the electronic lock and the mobile device 20 without the use of an added hub/gateway. As the mobile device 20 communicates directly with the electronic lock, the user experience is significantly simplified.

The mobile device user interface is easier to use than a keypad interface, and provides more programming options, thus improving the user experience in changing lock settings of the electronic lock. Also, the present invention takes into account battery life by allowing the user to manipulate lock settings while working offline. Further, the present invention facilitates communication with the electronic lock without having to utilize a network gateway or network controller.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An electronic lock comprising:
   an interior chassis configured to house an interior portion of the electronic lock;
   an exterior chassis configured to house an exterior portion of the electronic lock;
   a latch assembly including a bolt movable between an extended position and a retracted position located between both the interior and exterior chassis;
   a circuit configured to control movement of the bolt between the extended and retracted positions;
   a wireless module within one of the interior and exterior chassis configured to communicate directly with a mobile device without the use of an additional, auxiliary device;
   a non-transitory computer-readable medium having a plurality of lock settings and a computer program code stored thereon;
   a processor in communication with the computer-readable memory configured to carry out instructions in accordance with the computer program code, wherein the computer program code, when executed by the processor, causes the processor to perform operations comprising:
   sending and receiving wireless messages with the wireless module;
   wherein the wireless messages include an identification of changes to a plurality of lock settings;
   wherein the plurality of lock settings includes a command to modify a set of valid access codes;
   wherein the command to modify the set of valid access codes includes one of (1) adding a new valid access code and (2) deleting a valid access code;
   wherein responsive to the received wireless messages the processor updates the lock settings;
   wherein responsive to the processor updating the lock settings to one of (1) add the new valid access code and (2) delete the valid access code, the processor is configured to deny access in response to receiving the deleted access code and grant access in response to receiving the new valid access code;
   wherein the plurality of lock settings includes an interface with a synchronization portion updated by the processor in response to a user selecting the synchronization portion; and
   wherein the processor sends a message indicative of a status of the updated lock settings responsive to the wireless message.

2. The electronic lock according to claim 1, wherein the mobile device includes one of a smart phone, a tablet, an electronic device configured for dedicated functionality with the electronic lock, and a hand-held, portable electronic device.

3. The electronic lock according to claim 1,
wherein, responsive to the processor updating the lock settings to add the new valid access code, the circuit is configured to control movement of the bolt between the extended and retracted positions when granting access in response to receiving the new valid access code.

4. The electronic lock according to claim 1, wherein the lock settings include one of enabling, disabling, and adjusting a lock timer thus controlling movement of the bolt between the extended and retracted positions based on the timer.

5. The electronic lock according to claim 1, wherein the lock settings include one of illuminating and de-luminating a light on one of the interior and exterior chassis, the light including at least one of a lock status indicator light and a battery status indicator light.

6. The electronic lock according to claim 1, wherein the lock settings include configuring the bolt for operation with one of a left handed door and a right handed door.

7. The electronic lock according to claim 1, wherein the lock settings include one of enabling and disabling a tamper alarm configured to communicate with the mobile device that the electronic lock has experienced an unauthorized encounter.

8. The electronic lock according to claim 1, wherein the lock settings include one of adjusting a sound output level such that the electronic communicates via an audible message transmitted from a speaker within one of the interior and exterior chassis.

9. The electronic lock according to claim 1, wherein the lock settings include a user selected audio recording uploaded to the electronic lock from the mobile device for playback through the electronic lock.

10. A method of updating at least one of a plurality of lock setting for an electronic lock, the method comprising the steps of:
establishing direct communication between a mobile device and the electronic lock without the use of an added communication hub;
displaying, on the mobile device, a lock settings interface that allows adjustment of a plurality of lock setting of an electronic lock;
receiving, on the mobile device, one or more changes to the lock setting responsive to selections made by a user to the lock settings interface;
updating the lock settings of the electronic lock by transmitting, from the mobile device, a wireless message directly to the electronic lock that includes the changes to the lock settings made by the user in the lock settings interface;
wherein the wireless message includes an identification of one or more modifications to the plurality of lock settings; and
wherein the plurality of lock settings includes modifying a set of valid access codes;
wherein modifying the set of valid access codes includes one of (1) adding a new valid access code and (2) deleting a valid access code;
wherein responsive to updating the lock settings to one of (1) add the new valid access code and (2) delete the valid access code, denying access in response to receiving the deleted access code and granting access in response to receiving the new valid access code;
sending a message to the mobile device indicative of a status of the updated lock settings responsive to the wireless message.

11. The method of claim 10, further comprising:
automating a connection between the electronic lock and a remote server without user input; and
transmitting an Over The Air (OTA) firmware update to the electronic lock.

12. The method of claim 11, further comprising transmitting a usage data from the electronic lock to a remote server.

13. The method of claim 10, further comprising:
selecting a time and date schedule for a plurality of access codes on the mobile device;
transmitting the schedule of the plurality of access codes from the mobile device directly to the electronic lock; and
configuring the plurality of access codes to only function during a predetermined time and date according to the schedule.

14. The method of claim 10, further comprising displaying both current and past settings of the electronic lock on the mobile device.

15. The method of claim 11, further comprising:
transmitting from the electronic lock to the mobile device a plurality of error messages indicating a malfunction of the electronic lock; and
receiving a plurality of instructions from the remote server to the mobile device indicating a plurality of solutions for the malfunction.

16. The method of claim 10, further comprising transmitting the updated lock settings to a plurality of additional electronic locks thus syncing all of the electronic locks.

17. The method of claim 16, wherein the syncing includes one of the following communication protocols: BLE, Bluetooth, WIFI, NFC, Sound, Flashing Screen, Vibration, Zigbee, and Zwave.

18. A method of operating an electronic lock comprising:
providing an interior chassis configured to house an interior portion of the electronic lock;
providing an exterior chassis configured to house an exterior portion of the electronic lock;
providing a latch assembly including a bolt movable between an extended position and a retracted position located between the interior chassis and the exterior chassis;
providing a circuit configured to control movement of the bolt between the extended and retracted positions;
providing a wireless module within one of the interior and exterior chassis configured to communicate directly with a mobile device without the use of an additional, auxiliary device;
transmitting a wireless message to the electronic lock directly from the mobile device using the wireless module within one of interior chassis and exterior chassis, wherein the wireless message includes an identification of one or more changes to the lock settings;
wherein the one or more changes to the lock settings includes modifying a set of valid access codes by one of (1) adding a new valid access code and (2) deleting a valid access code;
wherein responsive to the changes to the lock settings, denying access in response to receiving the deleted access code and granting access in response to receiving the new valid access code;
responsive to the wireless message, updating the lock settings according to the wireless message; and
sending a message to the mobile device indicative of the updated lock settings.

19. The method of claim 18, further comprising:
wirelessly connecting the electronic lock to a remote server; and
pushing Over the Air updates to the electronic lock including at least one of firmware and additional features.

20. The method of claim 19, further comprising:
transmitting a log of user activity from the electronic lock to the remote server; and
transmitting user instructions from the remote server to the electronic lock based on the log.

\* \* \* \* \*